United States Patent
Chen et al.

(10) Patent No.: US 12,401,046 B2
(45) Date of Patent: Aug. 26, 2025

(54) NEGATIVE CURRENT COLLECTOR, PREPARATION METHOD OF THE SAME, SODIUM SECONDARY BATTERY, AND ELECTRICAL DEVICE

(71) Applicant: Hithium Tech HK Limited, HongKong (CN)

(72) Inventors: Kongyao Chen, Guangdong (CN); Shiwen Wang, Guangdong (CN); Renjie Qu, Guangdong (CN); Genghong Huang, Guangdong (CN); Xing Zhang, Guangdong (CN); Jie Zhang, Guangdong (CN)

(73) Assignee: Hithium Tech HK Limited, Hongkong (CN)

( * ) Notice: Subject to any disclaimer, the term of this patent is extended or adjusted under 35 U.S.C. 154(b) by 0 days.

(21) Appl. No.: 19/034,462

(22) Filed: Jan. 22, 2025

(65) Prior Publication Data
US 2025/0253355 A1 Aug. 7, 2025

(30) Foreign Application Priority Data
Feb. 7, 2024 (CN) .................. 202410171660.X

(51) Int. Cl.
*H01M 4/66* (2006.01)
*H01M 4/02* (2006.01)
*H01M 10/054* (2010.01)

(52) U.S. Cl.
CPC .......... *H01M 4/667* (2013.01); *H01M 4/663* (2013.01); *H01M 10/054* (2013.01); *H01M 2004/027* (2013.01)

(58) Field of Classification Search
CPC ..................................... H01M 4/667
See application file for complete search history.

(56) References Cited

U.S. PATENT DOCUMENTS

| | | |
|---|---|---|
| 5,721,068 A | 2/1998 | West et al. |
| 2019/0280326 A1 | 9/2019 | Ceder et al. |
| 2022/0069313 A1 | 3/2022 | He et al. |

FOREIGN PATENT DOCUMENTS

| | | |
|---|---|---|
| CN | 102916186 A | 2/2013 |
| CN | 109888193 A | 6/2019 |
| CN | 111293290 A | 6/2020 |
| CN | 114551798 A | 5/2022 |
| CN | 114843524 A | 8/2022 |
| CN | 115233020 A | 10/2022 |

(Continued)

OTHER PUBLICATIONS

First Office Action from corresponding Chinese Application No. 202410171660.X, dated Mar. 21, 2024. English translation attached.

(Continued)

*Primary Examiner* — Stephan J Essex

(57) ABSTRACT

The present application provides a negative current collector and a preparation method thereof, a sodium secondary battery, and an electrical device. The negative current collector includes a matrix and a functional layer disposed on at least one side of the matrix and includes a multifunctional additive. The multifunctional additive includes $Na_xMN_y \cdot zH_2O$, where: M includes an atom capable of forming an alloy with Na; N includes at least one of atom O, atom S, or atom Se; and $0<x\leq 5$, $0<y\leq 5$, and $0\leq z\leq 5$.

9 Claims, 1 Drawing Sheet

(56) References Cited

FOREIGN PATENT DOCUMENTS

| | | | |
|---|---|---|---|
| CN | 218274641 | U | 1/2023 |
| CN | 115763801 | A | 3/2023 |
| CN | 116021007 | A | 4/2023 |
| CN | 116825960 | A | 9/2023 |
| CN | 117317239 | A | 12/2023 |
| CN | 220400629 | U | 1/2024 |

OTHER PUBLICATIONS

Second Office Action from corresponding Chinese Application No. 202410171660.X, dated Apr. 4, 2024. English translation attached.
The Grant Notice from corresponding Chinese Application No. 202410171660.X, dated Apr. 21, 2024. English translation attached.

10
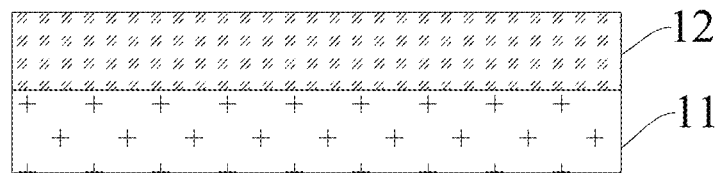

NEGATIVE CURRENT COLLECTOR, PREPARATION METHOD OF THE SAME, SODIUM SECONDARY BATTERY, AND ELECTRICAL DEVICE

CROSS-REFERENCE TO RELATED APPLICATIONS

This application claims priority to Chinese Patent Application No. 202410171660.X, filed on Feb. 7, 2024, which is incorporated herein by reference in its entirety.

FIELD

The present disclosure relates to the field of batteries, and more particularly, to a negative current collector, a preparation method thereof, a sodium secondary battery, and an electrical device.

BACKGROUND

Due to the abundance of sodium resources, sodium-ion batteries have been regarded as an important supplement to lithium batteries in the low-cost field. However, currently, the sodium-ion batteries have a relatively low overall energy density, which is much lower than that of lithium-ion batteries. Since metal sodium has a high theoretical specific capacity, an effective solution to improve the energy density is to use metal sodium as a negative electrode. When sodium batteries without negative active materials are charged and discharged for the first time, metal sodium will be deposited on the negative current collector. During the deposition process, sodium is may be unevenly deposited, and sodium dendrites may easily grow disorderly on the surface of the negative current collector, which increases the damage risk of the electrolyte interface film, thereby shortening the cycle life of the battery.

SUMMARY

A first aspect of the present disclosure provides a negative current collector of a sodium secondary battery without negative active materials. The negative current collector includes a matrix and a functional layer. The functional layer is disposed on at least one side of the matrix. The functional layer has a thickness ranging from 0.5 μm to 10 μm. The functional layer includes a carbon main material and a multifunctional additive. The multifunctional additive includes at least one of $Na_2SnO_3*3H_2O$, $Na_2ZnO_2$, or $NaBiO_3$. Based on a total mass of the functional layer, a mass percentage of the multifunctional additive ranges from 5% to 10%, and a mass percentage of the carbon main material ranging from 60% to 90%.

A second aspect of the present disclosure provides a method for preparing the negative current collector according to the first aspect of the present disclosure. The method includes: forming a functional layer on at least one side of a matrix. The functional layer has a thickness ranging from 0.5 μm to 10 μm. The functional layer includes a carbon main material and a multifunctional additive. The multifunctional additive includes at least one of $Na_2SnO_3*3H_2O$, $Na_2ZnO_2$, or $NaBiO_3$. Based on a total mass of the functional layer, a mass percentage of the multifunctional additive ranges from 5% to 10%, and a mass percentage of the carbon main material ranging from 60% to 90%.

A third aspect of the present disclosure provides a sodium secondary battery without negative active materials. The sodium secondary battery includes the negative current collector according to the first aspect of the present disclosure. Metal sodium is deposited on a side of the functional layer away from the matrix after a first charge and discharge of the sodium secondary battery without negative active materials.

A fourth aspect of the present disclosure provides an electrical device. The electrical device includes the sodium secondary battery according to the third aspect of the present disclosure.

BRIEF DESCRIPTION OF THE DRAWINGS

The foregoing and/or additional aspects and advantages of the present disclosure will become apparent and readily appreciated from the following description of the embodiments in conjunction with the accompanying drawings of which:

FIG. 1 is a schematic structural view of a negative current collector according to an embodiment of the present disclosure.

REFERENCE NUMERALS

10: negative current collector; 11: matrix; and 12: functional layer.

DETAILED DESCRIPTION

Embodiments of the present disclosure are described below. The embodiments described below are exemplary and are merely intended to illustrate the present disclosure and are not to be construed as limiting the present disclosure. Specific techniques or conditions, when not specified in the examples, are performed according to techniques or conditions described in the literature in the related art or according to the product description. The reagents or instruments used are conventional products that can be obtained commercially without indicating the manufacturer.

The present disclosure aims to solve, at least to some extent, one of the technical problems in the related art.

A first aspect of the present disclosure provides a negative current collector. The negative current collector includes a matrix and a functional layer. The functional layer is disposed on at least one side of the matrix. The functional layer includes a multifunctional additive. The multifunctional additive includes $Na_xMN_y*zH_2O$, where: M includes an atom capable of forming an alloy with Na; N includes at least one of atom O, atom S, or atom Se; and $0<x\leq5$, $0<y\leq5$, and $0\leq z\leq5$. The multifunctional additive has an affinity to sodium ions and is able to replenish and store sodium, which can reduce a nucleation overpotential of sodium deposition and improve uniformity of the sodium deposition. When a total amount of sodium ions reversibly stored between a positive electrode and a negative electrode decreases, the multifunctional additive can play a role in replenishing sodium to improve a coulombic efficiency of the battery and prolong a cycle life of the battery. The multifunctional additive can also store the sodium ions, i.e., having a function of storing sodium, thereby enhancing a specific capacity of the battery.

In at least one embodiment, M includes at least one of atom Sn, atom Sb, atom Bi, or atom Zn; and N includes at least one of atom O, atom S, or atom Se.

In at least one embodiment, M includes atom Sn; and N includes at least one of atom O and atom S. Thus, the negative current collector can be further improved in terms of the affinity to sodium ions and the ability of replenishing and storing sodium, thereby improving the coulombic efficiency and specific capacity of the battery and prolonging the cycle life of the battery.

In at least one embodiment, the multifunctional additive includes at least one of $Na_2SnO_3*3H_2O$, $Na_2ZnO_2$, $Na_3SbS_4$, or $NaBiO_3$. Therefore, the above-mentioned multifunctional additive can have a stable structure and have the affinity to sodium ions and the ability of replenishing and storing sodium, thereby improving the coulombic efficiency and specific capacity of the battery and prolonging the cycle life of the battery.

In at least one embodiment, a mass percentage of the multifunctional additive ranges from 1% to 10% based on a total mass of the functional layer. In this way, by increasing the mass percentage of the multifunctional additive in the functional layer, more sites having the affinity to sodium ions and the ability of replenishing and storing sodium can be formed on the functional layer. Thus, the affinity to sodium ions and the ability of replenishing and storing sodium of the respective regions of the functional layer are further improved. In addition, the uniformity of the sodium deposition in each region of the negative current collector is improved, thereby improving the coulombic efficiency and specific capacity of the battery and prolonging the cycle life of the battery.

In at least one embodiment, the functional layer has a thickness ranging from 0.5 μm to 10 μm. In this way, the sites having the affinity to sodium ions and the ability of replenishing and storing sodium on the negative current collector are increased, the affinity to sodium ions and the ability of replenishing and storing sodium of the multifunctional additive are improved, thereby improving the coulombic efficiency and specific capacity of the battery and prolonging the cycle life of the battery.

In at least one embodiment, the functional layer further includes at least one of a carbon main material and a binder. The carbon main material can provide uniform and stable loading sites for the multifunctional additive. In this way, the multifunctional additive can be uniformly distributed on the functional layer, and further, the uniformity of the sodium deposition in the respective regions of the functional layer is improved. The adhesion between the functional layer and the matrix is enhanced, thereby reducing the detachment risk of the functional layer.

In at least one embodiment, the negative current collector satisfies at least one of the following conditions: a mass percentage of the carbon main material ranging from 60% to 90% based on the total mass of the functional layer; and a mass percentage of the binder ranging from 5% to 30% based on the total mass of the functional layer. The carbon main material provides stable loading sites for the multifunctional additive. By controlling the content of the carbon main material within the above-mentioned range, more loading sites for the multifunctional additive can be formed on the functional layer. By controlling the content of the binder within the above-mentioned range, the adhesion between the functional layer and the matrix can be further improved, thereby reducing the detachment risk of the functional layer.

In at least one embodiment, the negative current collector satisfies at least one of the following conditions: the carbon main material including at least one of carbon black, carbon fiber, carbon nanotube, or graphene; and the binder including at least one of polyvinylidene fluoride, polyacrylonitrile, polyimide, sodium carboxymethyl cellulose, styrene butadiene rubber, sodium polyacrylate, sodium alginate, polytetrafluoroethylene, or polyvinyl alcohol.

A second aspect of the present disclosure provides a method for preparing the negative current collector according to the first aspect of the present disclosure. The method includes: forming a functional layer on at least one side of a matrix. The functional layer includes a multifunctional additive. The multifunctional additive includes $Na_xMN_y*zH_2O$, where: M includes an atom capable of forming an alloy with Na; N includes at least one of atom O, atom S, or atom Se; and $0<x\leq5$, $0<y\leq5$, and $0\leq z\leq5$. Therefore, the negative current collector prepared by the method has the multifunctional additive. The multifunctional additive has an affinity to sodium ions and is able to replenish and store sodium, which can reduce a nucleation overpotential of sodium deposition and improve uniformity of the sodium deposition. When a total amount of sodium ions reversibly stored between a positive electrode and a negative electrode decreases, the multifunctional additive can play a role in replenishing sodium to improve a coulombic efficiency of the battery and prolong a cycle life of the battery. The multifunctional additive can also store the sodium ions, i.e., having a function of storing sodium, thereby enhancing a specific capacity of the battery.

In at least one embodiment, the method further includes: mixing a carbon main material, the multifunctional additive, and a first solvent, and performing drying and heat treatment, to obtain a mixture; and mixing the mixture, a binder, and a second solvent to form a slurry; and applying the slurry on the at least one side of the matrix and drying, to form the functional layer. Therefore, the adhesion of the multifunctional additive in the carbon main material is improved, the mixing uniformity of the multifunctional additive and the carbon main material is improved, and the uniformity of the sodium deposition in the respective regions of the functional layer is improved.

In at least one embodiment, a temperature of the heat treatment ranges from 100° C. to 800° C. In this way, by controlling the temperature of the heat treatment within the above-mentioned range, a strength of the adhesion between the multifunctional additive and the carbon main material can be increased, and the detachment risk of the multifunctional additive can be reduced.

A third aspect of the present disclosure provides a sodium secondary battery. The sodium secondary battery includes the negative current collector according to the first aspect of the present disclosure or a negative current collector prepared by the method according to the second aspect of the present disclosure. Metal sodium is deposited on a side of the functional layer away from the matrix after a first charge and discharge of the sodium secondary battery. Therefore, the coulombic efficiency and specific capacity of the sodium secondary battery can be improved and the cycle life of the sodium secondary battery can be prolonged.

A fourth aspect of the present disclosure provides an electrical device. The electrical device includes the sodium secondary battery according to the third aspect of the present disclosure.

An aspect of the present disclosure provides a negative current collector. Referring to FIG. 1, the negative current collector 10 includes a matrix 11 and a functional layer 12 disposed on at least one side of the matrix 11. The functional layer 12 includes a multifunctional additive. The multifunctional additive includes $Na_xMN_y*zH_2O$, where: M includes an atom capable of forming an alloy with Na; N includes at least one of atom O, atom S, or atom Se; and $0<x\leq5$, $0<y\leq5$, and $0\leq z\leq5$. The multifunctional additive has an affinity to sodium ions and is able to replenish and store sodium, which can reduce a nucleation overpotential of sodium deposition and improve uniformity of the sodium deposition. When a total amount of sodium ions reversibly stored between a positive electrode and a negative electrode decreases, the multifunctional additive can play a role in replenishing sodium to improve a coulombic efficiency of the battery and prolong a cycle life of the battery. The multifunctional additive can also store the sodium ions, i.e., having a function of storing sodium, thereby enhancing a specific capacity of the battery.

The mechanism by which the above beneficial effects can be achieved by the present disclosure is described in detail below.

The negative current collector 10 according to the present disclosure includes the functional layer 12, and the functional layer 12 includes the multifunctional additive $Na_xMN_y*zH_2O$. The component of Na may serve as a "sodium storage pool" during a charging and discharging process of a battery, to release sodium ions when the overall sodium content of the battery decreases, i.e., having a function of replenishing sodium, thereby enhancing the coulombic efficiency of the battery. The component of M has intrinsic affinity to sodium ions and can easily react with the sodium ions to form alloys having high affinity to sodium ions (such as Na—Sn alloy and Na—Zn alloy), thereby reducing the nucleation overpotential of the sodium deposition on the negative current collector and the sodium deposition/stripping polarization potential. Thus, the uniformity and density of the sodium deposition can be enhanced, and sodium dendrites are less likely generated, which lowers the risk of battery short circuit caused by that the separator is pierced by the sodium dendrites, thereby prolonging the cycle life of the battery. In addition, the component of M can also store a large amount of sodium ions through alloying reactions (for example, by forming $Na_{15}Sn_4$, $Na_3Bi$, etc.), i.e., having the function of storing sodium, thereby enhancing the specific capacity of the battery. The component of N can further improve the stability of the multifunctional additive and can thus reduce the risk of oxidative decomposition of the multifunctional additive.

According to some embodiments of the present disclosure, the functional layer 12 is disposed on at least one surface of the matrix 11.

According to some embodiments of the present disclosure, M includes at least one of atom Sn, atom Sb, atom Bi, or atom Zn, and N includes at least one of atom O, atom S, or atom Se. The atoms Sn, Sb, Bi, and Zn have intrinsic affinity to sodium ions and can reduce the nucleation overpotential of the sodium deposition on the negative current collector and the sodium deposition/stripping polarization potential. Thus, the uniformity and density of the sodium deposition can be enhanced, and the sodium dendrites are less likely generated, which lowers the risk of battery short circuit caused by that the separator is pierced by the sodium dendrites, thereby prolonging the cycle life of the battery. In addition, the atoms Sn, Sb, Bi, and Zn can also store a large amount of sodium ions through alloying reactions (for example, by forming $Na_{15}Sn_4$, $Na_3Bi$, etc.), i.e., having the function of storing sodium, thereby enhancing the specific capacity of the battery. The atoms O, S, and Se can further improve the stability of the multifunctional additive and can thus lower the risk of oxidative decomposition of the multifunctional additive.

According to some embodiments of the present disclosure, M includes atom Sn, and N includes at least one of atom O and atom S. When M includes atom Sn, one Sn ion can bind with three or four Nations, thereby further improving the affinity to sodium ions and the ability of storing sodium. Thus, the uniformity and density of the sodium deposition can be enhanced, the coulombic efficiency and specific capacity of the battery can be improved, and the cycle life of the battery can be prolonged. When N includes at least one of atom O and atom S, the stability of the multifunctional additive can be further improved, lowering the risk of oxidative decomposition of the multifunctional additive.

According to some specific embodiments of the present disclosure, the multifunctional additive includes at least one of $Na_2SnO_3*3H_2O$, $Na_2ZnO_2$, $Na_3SbS_4$, or $NaBiO_3$. The above-mentioned multifunctional additives have the affinity to sodium ions and the ability of replenishing and storing sodium. Specifically, the component Na in the above-mentioned multifunctional additives may serve as a "sodium storage pool" during the charging and discharging process of a battery, to release sodium ions when the overall sodium content of the battery decreases, i.e., having a function of replenishing sodium, thereby enhancing the coulombic efficiency of the battery. The Sn ions, Zn ions, Sb ions, and Bi ions have intrinsic affinity to sodium ions and can easily react with the sodium ions to form alloys having high affinity to sodium ions (such as Na—Sn alloy, Na—Zn alloy, Na—Sb alloy, and Na—Bi alloy), thereby reducing the nucleation overpotential of the sodium deposition on the negative current collector 10 and the sodium deposition/stripping polarization potential. Thus, the uniformity and density of the sodium deposition can be enhanced, and the sodium dendrites are less likely generated, which lowers the risk of battery short circuit caused by that the separator is pierced by the sodium dendrites, thereby prolonging the cycle life of the battery. In addition, the Sn ions, Zn ions, Sb ions, and Bi ions can also store a large amount of sodium ions through alloying reactions (for example, by forming $Na_{15}Sn_4$, $Na_3Bi$, etc.), i.e., having the function of storing sodium, thereby enhancing the specific capacity of the battery. The atom O and atom S can further improve the stability of the multifunctional additive and can thus reduce the risk of oxidative decomposition of the multifunctional additive.

According to some embodiments of the present disclosure, a mass percentage of the multifunctional additive ranges from 1% to 10% based on a total mass of the functional layer 12. For example, the mass percentage of the multifunctional additive may be 1%, 2%, 3%, 4%, 5%, 6%, 7%, 8%, 9%, or 10%, etc., or may be within a range consisting of any of the above values. By increasing the mass percentage of the multifunctional additive in the functional layer 12, more sites having the affinity to sodium ions and the ability of replenishing and storing sodium are formed and uniformly distributed on the functional layer 12, and the respective regions of the functional layer 12 have higher uniformity in terms of the affinity to sodium ions and the ability of replenishing and storing sodium, thereby improving the uniformity of the sodium metal layer formed by deposition and reducing the probability of generating sodium dendrites. Thus, the coulombic efficiency and specific capacity of the battery can be enhanced, and the cycle life of the battery can be prolonged. The excessively low content of the multifunctional additive may result in less sites having the affinity to sodium ions and the ability of replenishing and storing sodium formed on the functional layer 12, which may affect the improvement effects of the multifunctional additive on the sodium deposition/stripping process to a certain extent. The excessively high content of the non-conductive multifunctional additive may affect the transmission of electrons and ions on the negative current collector 10 to a certain extent, leading to a deterioration of the reversibility of the sodium deposition/stripping process.

According to some embodiments of the present disclosure, the presence and content of the multifunctional additive in the functional layer 12 may be identified by atomic fluorescence spectroscopy, inductively coupled plasma mass spectrometry, flame atomic absorption spectroscopy, and the like.

According to some embodiments of the present disclosure, the functional layer 12 has a thickness ranging from 0.5 µm to 10 µm. For example, the thickness may be 0.5 µm, 1 µm, 3 µm, 5 µm, 7 µm, 9 µm, or 10 µm, or may be within a range consisting of any of the above numerical values. By controlling the thickness of the functional layer 12 within the above range, the number of sites having the affinity to sodium ions and the ability of replenishing and storing sodium can be increased, thereby improving the uniformity of the sodium deposition. At the same time, the transmission rate of the electrolyte on the negative current collector 10 can be enhanced, and the electrolyte can have higher wettability to the negative current collector 10. By controlling the thickness of the functional layer 12 within the above range, the detachment risk of the functional layer 12 attributed to the excessively great thickness of the functional layer 12 can be lowered. If the thickness of the functional layer 12 is excessively small, the number of the sites having the affinity to sodium ions and the ability of replenishing and storing sodium on the surface of the matrix is relatively small, which affects the uniformity of the sodium deposition and further affects the electrochemical performances. If the thickness of the functional layer 12 is excessively great, that is, the distance from the surface of the functional layer 12 to the surface of the matrix 11 is great, which increases the electron/ion transmission distance, thereby affecting the rapid sodium deposition/stripping of the battery. Moreover, the excessively great thickness of the functional layer 12 may results in a deterioration of the adhesion between the functional layer 12 and the matrix 11, thereby increasing the risk of the detachment the functional layer 12 and poor electrolyte wettability to a certain extent.

According to some embodiments of the present disclosure, the functional layer 12 may further include a carbon main material. The carbon main material can provide uniform and stable loading sites for the multifunctional additive, which can improve the distribution uniformity of the multifunctional additives in the functional layer 12, thereby improving the uniformity in terms of the affinity to sodium ions and the ability of replenishing and storing sodium of the respective regions of the functional layer 12. In this way, the uniformity of the sodium deposition is improved, and the probability of local generation of the sodium dendrites is reduced, thereby enhancing the coulombic efficiency and specific capacity of the battery and prolonging the cycle life of the battery.

According to some specific embodiments of the present disclosure, a mass percentage of the carbon main material ranges from 60% to 90% based on the total mass of the functional layer 12. For example, the mass percentage of the carbon main material may be 60%, 65%, 70%, 75%, 80%, 85% or 90%, etc., or it may be within a range consisting of any of the above numerical values. By controlling the mass percentage of the carbon main material within the above-mentioned range, more loading sites for the multifunctional additive can be provided and uniformly distributed on the surface of the matrix 11, thereby improving the uniformity of the distribution of the multifunctional additive in the functional layer 12. Thus, the uniformity in terms of the affinity to sodium ions and the ability of replenishing and storing sodium of the respective regions of the functional layer 12 can be improved, and thus the uniformity of the sodium deposition can be improved, thereby prolonging the cycle life of the battery. The excessively low content of the main carbon material may result in excessively high content of other non-conductive materials in the functional layer 12, the electron transmission ability of the negative current collector 10 may be lowered to a certain extent, thereby leading to a deterioration of the reversibility of the sodium deposition/stripping process.

As an example, the carbon main material includes at least one of carbon black, carbon fiber, carbon nanotube, or graphene.

According to some embodiments of the present disclosure, the functional layer 12 may further include a binder, which improves the adhesion between the functional layer 12 and the matrix 11, thereby preventing the detachment of the functional layer 12.

According to some specific embodiments of the present disclosure, a mass percentage of the binder ranges from 5% to 30% based on the total mass of the functional layer 12. For example, the mass percentage of the binder may be 5%, 10%, 15%, 20%, 25%, or 30%, etc., or may be within a range consisting of the above arbitrary values. In this way, the adhesion between the functional layer 12 and the matrix 11 is improved, and thus the detachment risk of the functional layer 12 is reduced. According to some specific embodiments of the present disclosure, the mass percentage of the binder may range from 10% to 20% based on the total mass of the functional layer 12. If the content of the binder is excessively high, the non-conductive binder may affect the transmission of electrons/ions in the functional layer 12 to a certain extent, thereby affecting the sodium deposition/stripping process. If the content of the binder is excessively low, the adhesion between the functional layer 12 and the matrix 11 will be reduced, thereby increasing the detachment risk of the functional layer 12.

According to some specific embodiments of the present disclosure, the binder may include at least one of polyvinylidene fluoride (PVDF), polyacrylonitrile, polyimide, sodium carboxymethyl cellulose (CMC-Na), styrene butadiene rubber, sodium polyacrylate, sodium alginate, polytetrafluoroethylene, and polyvinyl alcohol.

According to some embodiments of the present disclosure, the functional layer 12 includes a multifunctional additive, a carbon main material, and a binder. Specifically, the method for preparing the negative current collector 10 may include: mixing the multifunctional additive, the carbon main material, and the binder with a solvent to form a slurry, applying the slurry on at least one surface of the matrix 11 and drying, to form a functional layer 12.

As an example, the slurry may be mechanically stirred or ball milling stirred during the formation process, for improving the uniformity of the slurry.

As an example, when the sodium secondary battery is a sodium metal battery, the matrix 11 of the negative current collector 10 may be metal sodium.

As an example, when the sodium secondary battery is a sodium battery without negative active materials, the matrix 11 of the negative current collector 10 may be a metal foil, a porous metal plate, or a composite current collector. The composite current collector may include a polymer material matrix and a metal layer formed on at least one surface of the polymer material matrix 11. The composite current collector may be formed by forming a metallic material (copper, copper alloy, nickel, nickel alloy, titanium, titanium alloy, silver, and silver alloy, etc.) on the matrix 11 of the polymer material matrix 11 (such as polypropylene (PP), polyethylene terephthalate (PET), polybutylene terephthalate (PBT), polystyrene (PS), and polyethylene (PE)).

According to some specific embodiments of the present disclosure, the matrix 11 of the negative current collector 10 may be aluminum.

A second aspect of the present disclosure provides a method for preparing the negative current collector 10 according to the first aspect of the present disclosure. The method includes: forming a functional layer 12 on at least one side of the matrix 11. The functional layer 12 includes a multifunctional additive. The multifunctional additive includes $Na_xMN_y*zH_2O$, where: M includes an atom capable of forming an alloy with Na; N includes at least one of atom O, atom S, or atom Se; and $0<x\leq 5$, $0<y\leq 5$, and $0\leq z\leq 5$.

According to some embodiments of the present disclosure, the method further includes: mixing a carbon main material, the multifunctional additive, and a first solvent, and performing drying and heat treatment, to obtain a mixture; mixing the mixture, a binder, and a second solvent to form a slurry; and applying the slurry on the at least one side of the matrix 11 and drying, to form the functional layer 12. Specifically, the carbon main material and the multifunctional additive, and water may be mixed, allowing the carbon main material and the multifunctional additive to be uniformly mixed in the water. After drying to remove the first solvent, a high-temperature heat treatment is performed on the mixture to improve the adhesion between the multifunctional additive and the carbon main material. The mixture is mixed with the binder and the second solvent to form the slurry, which is applied on at least one side of the matrix 11. After drying, a functional layer 12, which has the uniformly distributed multifunctional additive and is not easy to detach, is formed.

As an example, the slurry may be coated on at least one surface of the matrix 11 by rolling, brushing, spraying, and the like.

According to some embodiments of the present disclosure, a temperature of the heat treatment may range from 100° C. to 800° C. For example, the temperature may be 100° C., 200° C., 300° C., 400° C., 500° C., 600° C., 700° C., or 800° C., or may be within a range consisting of the above arbitrary values. By mixing the carbon main material and the multifunctional additive within the above temperature range, the adhesion between the carbon main material and the multifunctional additive can be improved, the uniformity of the distribution of the multifunctional additive in the carbon main material can be improved, and thus the uniformity of the distribution of the multifunctional additive in the respective regions of the functional layer can be improved. In this way, the respective regions of the functional layer can be uniform in terms of the affinity to sodium ions and the ability of replenishing and storing sodium, and the uniformity of the sodium deposition can be improved. According to some specific embodiments of the present disclosure, the temperature of the heat treatment may range from 400° C. to 600° C.

A third aspect of the present disclosure provides a sodium secondary battery. The sodium secondary battery includes the negative current collector 10 according to the first aspect of the present disclosure or a negative current collector 10 prepared by the method according to the second aspect of the present disclosure. Metal sodium is deposited on a side of the functional layer 12 away from the matrix 11 after a first charge and discharge of the sodium secondary battery. Therefore, the coulombic efficiency and specific capacity of the sodium secondary battery can be improved and the cycle life of the sodium secondary battery can be prolonged.

As an example, the sodium secondary battery may be a sodium metal battery or a sodium battery without negative active materials.

According to some embodiments of the present disclosure, the sodium secondary battery further includes a positive electrode plate and a separator disposed between the positive electrode plate and the negative current collector.

The positive electrode plate includes a positive current collector and a positive active material layer formed on the positive current collector. The positive active material layer includes a positive active substance, a positive electrode binder, and a positive electrode conductive agent. In the embodiment of the present disclosure, the positive current collector may be made of a material with good electrical conductivity and mechanical strength, and preferably, the positive current collector is aluminum foil.

In the embodiments of the present disclosure, the specific type of the positive active substance is not particularly limited, and those skilled in the art may select according to actual needs. As some specific examples, the positive active substance includes at least one of sodium vanadium phosphate, sodium vanadium fluorophosphate, sodium iron phosphate, sodium iron pyrophosphate, and composite sodium iron phosphate.

In the embodiments of the present disclosure, the specific type of the positive electrode conductive agent is not particularly limited, and those skilled in the art may select according to actual needs. As some specific examples, the positive electrode conductive agent includes at least one of graphite, superconducting carbon, acetylene black, carbon black, Ketjen black, carbon dots, carbon nanotubes, graphene, and carbon nanofibers.

The specific type of the positive electrode binder is not particularly limited, and those skilled in the art may select according to actual needs. As some specific examples, the positive electrode binder includes at least one of polyvinylidene fluoride (PVDF) and polytetrafluoroethylene (PTFE).

The preparation method of the positive electrode plate includes: mixing the positive active material, the positive electrode binder, and the positive electrode conductive agent uniformly according to a preset ratio, adding a solvent, and stirring the mixture uniformly, to form a positive electrode slurry; and then coating the slurry on the current collector, drying, and finally cutting into a specific shape of positive electrode plates according to the different battery casing for use.

A fourth aspect of the present disclosure provides an electrical device. The electrical device includes the sodium secondary battery according to the third aspect of the present disclosure.

Specifically, the above-mentioned electrical device may be, but is not limited to, mobile phones, tablets, laptop computers, electric toys, electric tools, battery vehicles, electric vehicles, ships, spacecraft, etc. The electric toys may include fixed or mobile electric toys, such as game consoles, electric car toys, electric ship toys, and electric airplane toys, etc., and the spacecraft may include airplanes, rockets, space shuttles, and spaceship, etc.

Examples of the present disclosure are described in detail below. It should be noted that the examples described below are illustrative and are merely used to explain the present disclosure, and should not be construed as limiting the present disclosure. In addition, unless explicitly stated, all reagents used in the following examples are commercially available, or can be synthesized according to the methods described herein or known methods, and reaction conditions not listed are also easily obtained by those skilled in the art.

Example 1

1. Preparation of a Negative Current Collector

A carbon main material, a multifunctional additive, and water were mixed according to a mass ratio of 67:8:100, and the mixture was mechanically stirred for 2 hours to mix uniformly. After mixing uniformly, the mixture was dried to remove water. Then, the mixture was transferred to a nitrogen-protected tubular furnace, heated to 500° C., and subjected to a heat treatment for 3 hours. The heat-treated product was mixed with a binder according to a mass ratio of 75:25, then a certain amount of solvent (N-methyl pyrrolidone) was added, and the mixture was stirred to form a uniform slurry with a solid content of 10%. The slurry was coated on an aluminum foil using a coating machine and dried in an oven. The current collector was cold pressed by a roller press, to form a functional layer with a thickness of 8 μm.

2. Preparation of a Positive Electrode Plate

An active material (sodium vanadium phosphate), a conductive agent (Ketjen black), and a binder (PVDF) were mixed uniformly according to a mass ratio of 90:3:7 in a stirring device, and then a certain amount of solvent (N-methyl pyrrolidone) was added. The mixture was stirred to form a uniform slurry with a solid content of 40%. The slurry was coated on a positive current collector aluminum foil using a coating machine, dried, and cold pressed, to obtain a positive electrode plate.

3. Preparation of an Electrolyte

In an argon-protected glove box, 1 L of diglycol dimethyl ether was taken and placed into a volumetric flask; 168 g of sodium hexafluorophosphate was weighed and dissolved in the above solvent; and the mixture was stirred thoroughly until the sodium salt was completely dissolved. In this way, the electrolyte was prepared.

4. Separator

A polyethylene film with a thickness of 16 μm was used as the separator.

5. Assembly of a Half Battery

The positive electrode plate, the negative current collector, and the separator were respectively punched into small round pieces with different diameters using a circular hole slicer. The negative current collector, the separator, and a metal sodium plate were put into a button battery casing in order to enable the separator to be disposed between the negative current collector and the metal sodium plate, and the above-mentioned electrolyte was added. In this way, a button half battery was assembled.

6. Assembly of a Full Battery

The positive electrode plate, the separator, and the negative current collector were stacked in order to enable the separator to be located between the positive electrode plate and the negative current collector, and the above-mentioned electrolyte was added. In this way, a full battery was assembled.

The preparation methods of the batteries in Example 2 to Example 19 and Comparative Example 1 to Comparative Example 3 were the same as that in Example 1, and the differences were detailed in Table 1.

TABLE 1

| | Negative current collector | | | | | | | | Temperature of heat treatment/ °C. |
|---|---|---|---|---|---|---|---|---|---|
| | | Functional layer | | | | | | | |
| | Matrix | Carbon main material | Content/ % | Multifunctional additive | Content/ % | Binder | Content/ % | Thickness/ μm | |
| Comparative Example 1 | Al | / | / | / | / | / | / | / | / |
| Comparative Example 2 | Al | Carbon fiber | 75 | | / | PVDF | 25 | 8 | / |
| Comparative Example 3 | Al | Carbon fiber | 67 | $SnO_2$ | 8 | PVDF | 25 | 8 | 500 |
| Example 1 | Al | Carbon fiber | 67 | $Na_2SnO_3 \cdot 3H_2O$ | 8 | PVDF | 25 | 8 | 500 |
| Example 2 | Al | Carbon fiber | 67 | $Na_2ZnO_2$ | 8 | PVDF | 25 | 8 | 500 |
| Example 3 | Al | Carbon fiber | 67 | $Na_3SbS_4$ | 8 | PVDF | 25 | 8 | 500 |
| Example 4 | Al | Carbon fiber | 67 | $NaBiO_3$ | 8 | PVDF | 25 | 8 | 500 |
| Example 5 | Al | Carbon fiber | 74.8 | $Na_2SnO_3 \cdot 3H_2O$ | 0.2 | PVDF | 25 | 8 | 500 |
| Example 6 | Al | Carbon fiber | 74 | $Na_2SnO_3 \cdot 3H_2O$ | 1 | PVDF | 25 | 8 | 500 |
| Example 7 | Al | Carbon fiber | 70 | $Na_2SnO_3 \cdot 3H_2O$ | 5 | PVDF | 25 | 8 | 500 |
| Example 8 | Al | Carbon fiber | 65 | $Na_2SnO_3 \cdot 3H_2O$ | 10 | PVDF | 25 | 8 | 500 |
| Example 9 | Al | Carbon fiber | 55 | $Na_2SnO_3 \cdot 3H_2O$ | 30 | PVDF | 25 | 8 | 500 |
| Example 10 | Al | Carbon fiber | 67 | $Na_2SnO_3 \cdot 3H_2O$ | 8 | PVDF | 25 | 0.2 | 500 |
| Example 11 | Al | Carbon fiber | 67 | $Na_2SnO_3 \cdot 3H_2O$ | 8 | PVDF | 25 | 0.5 | 500 |
| Example 12 | Al | Carbon fiber | 67 | $Na_2SnO_3 \cdot 3H_2O$ | 8 | PVDF | 25 | 5 | 500 |
| Example 13 | Al | Carbon fiber | 67 | $Na_2SnO_3 \cdot 3H_2O$ | 8 | PVDF | 25 | 10 | 500 |
| Example 14 | Al | Carbon fiber | 67 | $Na_2SnO_3 \cdot 3H_2O$ | 8 | PVDF | 25 | 20 | 500 |
| Example 15 | Al | Carbon fiber | 67 | $Na_2SnO_3 \cdot 3H_2O$ | 8 | PVDF | 25 | 8 | 50 |
| Example 16 | Al | Carbon fiber | 67 | $Na_2SnO_3 \cdot 3H_2O$ | 8 | PVDF | 25 | 8 | 100 |
| Example 17 | Al | Carbon fiber | 67 | $Na_2SnO_3 \cdot 3H_2O$ | 8 | PVDF | 25 | 8 | 400 |
| Example 18 | Al | Carbon fiber | 67 | $Na_2SnO_3 \cdot 3H_2O$ | 8 | PVDF | 25 | 8 | 600 |
| Example 19 | Al | Carbon fiber | 67 | $Na_2SnO_3 \cdot 3H_2O$ | 8 | PVDF | 25 | 8 | 800 |

Tests of Performances

1. Test Methods for Nucleation Overpotential and Polarization Potential

A constant current charge and discharge test was performed on the half battery at a battery charge and discharge tester. The charge and discharge currents were both set to 2 mA/cm$^2$, a discharge cut-off capacity was set to 2 mAh/cm$^2$, and a charge cut-off voltage was set to 1.5V. The 10th cycle charge and discharge curve of the battery was plotted to read sodium nucleation overpotential thereof, which was the nucleation overpotential of the sodium deposition of the negative current collector. The 10th cycle charge and discharge curve of the battery was plotted to calculate charge and discharge polarization potential thereof, which was the polarization potential of the negative current collector.

2. Test Method for First Discharge Specific Capacity

A constant current charge and discharge test was performed on the full battery at a battery charge and discharge tester. Based on the mass of the positive active material, a charge and discharge current density was set to 100 mA/g, and a charge and discharge voltage was set to range from 2.5 V to 3.8 V. The discharge specific capacity of the first cycle was the first discharge specific capacity of the battery.

3. Test Method for Capacity Retention Rate after 100 Cycles

A constant current charge and discharge test was performed on the full battery at a battery charge and discharge tester. Based on the mass of the positive active material, a charge and discharge current density was set to 100 mA/g, and a charge and discharge voltage was set to range from 2.5 V to 3.8 V. A ratio of the discharge specific capacity of the 100th cycle to the discharge specific capacity of the first cycle was the capacity retention rate after 100 cycles.

4. Test Method for Average Coulombic Efficiency of 100 Cycles

A constant current charge and discharge test was performed on the full battery at a battery charge and discharge tester. Based on the mass of the positive active material, a charge and discharge current density was set to 100 mA/g, and a charge and discharge voltage was set to range from 2.5 V to 3.8 V. An average value of the coulombic efficiencies from the first cycle to the 100th cycle was the average coulombic efficiency of 100 cycles.

5. Test Method for Thickness of the Functional Layer

A bare foil used in the above examples was taken, and a thickness ($T_0$) thereof was measured using a thickness gauge. The negative current collector coated with the functional coating on both sides prepared in the above examples was taken, and a thickness ($T_1$) thereof was measured using a thickness gauge. Thus, a thickness $T_2$ of the functional layer was calculated based on $T_2=(T_1-T_0)/2$.

The test results of the batteries in Example 1 to Example 19 and Comparative Example 1 to Comparative Example 3 were shown in Table 2.

TABLE 2

| | Nucleation overpotential/ mV | Polarization potential/ mV | First discharge specific capacity/ mAh/g | Capacity retention rate after 100 cycles/% | Average coulombic efficiency of 100 cycles/% |
|---|---|---|---|---|---|
| Comparative Example 1 | 119 | 61 | 86.4 | 50.2 | 99.27 |
| Comparative Example 2 | 81 | 57 | 100.2 | 76.2 | 99.68 |
| Comparative Example 3 | 72 | 55 | 101.1 | 77.8 | 99.7 |
| Example 1 | 56 | 41 | 106.3 | 94.2 | 99.9 |
| Example 2 | 65 | 44 | 103.5 | 91.1 | 99.86 |
| Example 3 | 51 | 49 | 107.6 | 85.8 | 99.8 |
| Example 4 | 61 | 53 | 105.1 | 81.7 | 99.75 |
| Example 5 | 68 | 53 | 102.2 | 81.8 | 99.75 |
| Example 6 | 62 | 47 | 103.6 | 89.2 | 99.84 |
| Example 7 | 57 | 40 | 104.1 | 95.6 | 99.92 |
| Example 8 | 52 | 43 | 105.5 | 92.3 | 99.87 |
| Example 9 | 47 | 50 | 106.1 | 84.4 | 99.79 |
| Example 10 | 62 | 52 | 103.9 | 83.1 | 99.77 |
| Example 11 | 60 | 45 | 104.2 | 89.4 | 99.84 |
| Example 12 | 57 | 38 | 105.7 | 96.5 | 99.92 |
| Example 13 | 55 | 41 | 106.9 | 93.8 | 99.89 |
| Example 14 | 53 | 49 | 107.3 | 84.6 | 99.79 |
| Example 15 | 60 | 51 | 105.3 | 83.8 | 99.78 |
| Example 16 | 57 | 45 | 105.6 | 89.7 | 99.84 |
| Example 17 | 53 | 42 | 105.2 | 92.5 | 99.88 |
| Example 18 | 54 | 41 | 105.9 | 94.1 | 99.9 |
| Example 19 | 59 | 46 | 105.5 | 89.4 | 99.85 |

The negative current collector in Comparative Example 1 included no functional layer; the negative current collector in Comparative Example 2 was provided with a functional layer, which included no multifunctional additive; the negative current collector in Comparative Example 3 was provided with a functional layer, which included an additive other than the multifunctional additive of the present disclosure; and the negative current collectors of Example 1 to Example 19 were each provided with a functional layer, which included a multifunctional additive having the affinity to sodium ions and the ability of replenishing and storing sodium. As can be seen from Table 1 and Table 2, the test results reveal that: the sodium deposition potential and polarization potential in Example 1 to Example 19 were both lower than those in Comparative Example 1 to Comparative Example 3; and the first discharge specific capacity, cycle capacity retention rate, and coulombic efficiency in Example 1 to Example 19 were all higher than those in Comparative Example 1 to Comparative Example 3. These results indicate that, according to the present disclosure, by providing the multifunctional additive having the affinity to sodium ions and the ability of replenishing and storing sodium in the functional layer, the nucleation overpotential and polarization potential of the sodium deposition can be lowered, the uniformity and density of the sodium deposition can be enhanced. In addition, the multifunctional additive has the function of replenishing sodium when the overall sodium content of the battery decreases, and it can also store the sodium ions through alloying reactions.

The comparison between Example 1 to Example 4 and Comparative Example 3 reveal that, for Comparative Example 3, the nucleation overpotential was relatively high, and the first discharge specific capacity, cycle capacity retention rate, and coulombic efficiency were relatively low, due to the additive in Comparative Example 3 being other than the additive having the affinity to sodium ions and the ability of replenishing and storing sodium according to the present disclosure. As the multifunctional additives in Example 1 to Example 4 had the affinity to sodium ions and the ability of replenishing and storing sodium, the cycle capacity retention rate and coulombic efficiency of the battery can be enhanced.

Based on Example 5 to Example 9, according to the present disclosure, by adjusting the content of the multifunctional additive, the nucleation overpotential and polarization potential of the sodium deposition can be lowered, the coulombic efficiency of the battery can be improved, and the cycle life of the battery can be prolonged. The comparison between Example 6 to Example 8 and Example 5 reveal that the excessively low content of the multifunctional additive may lower the affinity to sodium ions and the ability of replenishing and storing sodium of the multifunctional additive, thereby shortening the cycle life of the battery and reducing the coulombic efficiency of the battery to a certain extent. Based on Example 6 to Example 8 and Example 9, if the content of the multifunctional additive is excessively high, the multifunctional additive may be non-conducting, which will increase the polarization potential to a certain extent, affect transport of electrons by the negative current collector, and affect reversibility of the sodium deposition/stripping process.

Example 10 to Example 14 reveal that, according to the present disclosure, by adjusting the thickness of the functional layer, the content of the multifunctional additive on the negative current collector can be increased, and the affinity to sodium ions and the ability of replenishing and storing sodium of the multifunctional additive can be improved, thereby prolonging the cycle life of the battery and improving the coulombic efficiency of the battery. The comparison between Example 11 to Example 13 and Example 10 reveal that the excessively small thickness of the functional layer may result in the excessively low content of the multifunctional additive on the functional layer, which may reduce the cycle capacity retention rate and coulombic efficiency of the battery to a certain extent. The comparison between Example 11 to Example 13 and Example 14 reveals that if the excessively great thickness of the functional layer increases the transmission distance of electrons/ions, thereby reducing the reversibility of the sodium deposition/stripping to a certain extent.

Example 15 to Example 19 reveal that, according to the present disclosure, by performing the heat treatments on the multifunctional additive and the carbon main material, the mixing uniformity of the carbon main material and the multifunctional additive can be improved, and thus the adhesion between the multifunctional additive and the carbon main material can be improved, thereby improving the cycle performance and coulombic efficiency of the battery. The comparison between Example 16 to Example 19 and Example 15 reveal that, if the temperature of the heat treatment is relatively low, the mixing uniformity of the carbon main material and the multifunctional additive may be affected, and the cycle capacity retention rate and coulombic efficiency of the battery may deteriorate to a certain extent.

In the description of the present disclosure, it should be understood that the orientation or position relationship indicated by the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", and "circumferential", etc. is based on the orientation or position relationship shown in the drawings, and is only for the convenience of describing the present disclosure and simplifying the description, rather than indicating or implying that the pointed device or element must have a specific orientation, or be constructed and operated in a specific orientation, and therefore cannot be understood as a limitation of the present disclosure.

Furthermore, the terms "first" and "second" are used for descriptive purposes only and are not to be construed as indicating or implying relative importance or implicitly indicating the number of technical features indicated. Thus, a feature defined as "first" or "second" may explicitly or implicitly include at least one such feature. In the description of the present disclosure, the meaning of "plurality" is at least two, unless specifically and specifically limited otherwise.

In the specification, the description of the reference terms such as "one embodiment", "some embodiments", "example", "specific example", or "some examples" means that the specific features, structures, materials, or characteristics described with reference to the embodiment or example are included in at least an embodiment or example of the present disclosure. In this specification, exemplary descriptions of the foregoing terms do not necessarily refer to the same embodiment or example. Moreover, the specific features, structures, materials, or characteristics described may be combined in any one or more embodiments or examples in a suitable manner. Furthermore, those skilled in the art may combine different embodiments or examples and features of different embodiments or examples described in this specification, unless they are contradictory to each other.

Although embodiments of the present disclosure are illustrated and described above, it can be understood that the above embodiments are illustrative and should not be construed as limitations of the present disclosure. Those skilled in the art can make changes, modifications, substitutions, and variations to the above embodiments within the scope of the present disclosure.

What is claimed is:

1. A negative current collector of a sodium secondary battery without a negative active material comprising:
   a matrix; and
   a functional layer disposed on at least one side of the matrix and having a thickness ranging from 0.5 μm to 10 μm, the functional layer comprising a carbon main material and a multifunctional additive, the multifunctional additive comprising at least one of $Na_2SnO_3 \cdot 3H_2O$, $Na_2ZnO_2$, or $NaBiO_3$, wherein:
   based on a total mass of the functional layer, a mass percentage of the multifunctional additive ranges from 5% to 10%, and a mass percentage of the carbon main material ranges from 60% to 90%.

2. The negative current collector of a sodium secondary battery without a negative active material according to claim 1, wherein the functional layer further comprises a binder.

3. The negative current collector of a sodium secondary battery without a negative active material according to claim 2, wherein a mass percentage of the binder ranges from 5% to 30% based on the total mass of the functional layer.

4. The negative current collector of a sodium secondary battery without a negative active material according to claim 3, satisfying at least one of the following conditions:
the carbon main material comprising at least one of carbon black, carbon fiber, carbon nanotube, or graphene; or
the binder comprising at least one of polyvinylidene fluoride, polyacrylonitrile, polyimide, sodium carboxymethyl cellulose, styrene butadiene rubber, sodium polyacrylate, sodium alginate, polytetrafluoroethylene, or polyvinyl alcohol.

5. A method for preparing the negative current collector of a sodium secondary battery without a negative active material according to claim 1, the method comprising:
forming the functional layer on at least one side of the matrix, wherein:
the functional layer has a thickness ranging from 0.5 μm to 10 μm;
the functional layer comprises a carbon main material and a multifunctional additive;
the multifunctional additive comprises at least one of $Na_2SnO_3*3H_2O$, $Na_2ZnO_2$, or $NaBiO_3$;
based on a total mass of the functional layer, a mass percentage of the multifunctional additive ranges from 5% to 10%, and a mass percentage of the carbon main material ranging from 60% to 90%.

6. The method according to claim 5, the step of forming the functional layer on at least one side of the matrix comprising:
mixing the carbon main material, the multifunctional additive, and a first solvent, and performing drying and heat treatment, to obtain a mixture;
mixing the mixture, a binder, and a second solvent to form a slurry; and
applying the slurry on the at least one side of the matrix and drying, to form the functional layer.

7. The method according to claim 6, wherein a temperature of the heat treatment ranges from 100° C. to 800° C.

8. A sodium secondary battery without a negative active material, comprising:
the negative current collector of a sodium secondary battery without a negative active material according to claim 1,
wherein metal sodium is deposited on a side of the functional layer away from the matrix subsequent to a first charge and discharge of the sodium secondary battery without a negative active material.

9. An electrical device, comprising the sodium secondary battery without a negative active material according to claim 8.

* * * * *